United States Patent
Brown et al.

(10) Patent No.: US 11,240,286 B2
(45) Date of Patent: Feb. 1, 2022

(54) SOFTWARE REQUEST-FILTERING PREDICTIVE TECHNIQUE BASED ON RESOURCE USAGE PROBABILITIES

(71) Applicant: International Business Machines Corporation, Armonk, NY (US)

(72) Inventors: Kyle G. Brown, Apex, NC (US); Samir A. Nasser, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1776 days.

(21) Appl. No.: 14/754,675

(22) Filed: Jun. 29, 2015

(65) Prior Publication Data

US 2016/0379130 A1 Dec. 29, 2016

(51) Int. Cl.
  *H04L 29/08* (2006.01)
(52) U.S. Cl.
  CPC .................................. *H04L 67/00* (2013.01)
(58) Field of Classification Search
  CPC ........... G06N 5/02; G06N 5/022; G06N 5/025
  See application file for complete search history.

(56) References Cited

U.S. PATENT DOCUMENTS

| | | | | |
|---|---|---|---|---|
| 4,833,599 A | * | 5/1989 | Colwell | G06F 9/264 712/236 |
| 5,951,674 A | * | 9/1999 | Moreno | G06F 8/445 712/200 |
| 8,005,933 B2 | | 8/2011 | Brown et al. | |
| 8,180,849 B2 | | 5/2012 | Viegener et al. | |
| 2009/0106737 A1 | * | 4/2009 | Chockler | G06F 11/3604 717/126 |
| 2010/0205416 A1 | | 8/2010 | Lanner et al. | |
| 2011/0313957 A1 | * | 12/2011 | Ide | G01C 21/20 706/12 |
| 2012/0047505 A1 | * | 2/2012 | Branson | G06F 17/30563 718/100 |
| 2015/0040181 A1 | | 2/2015 | Cook et al. | |
| 2016/0232193 A1 | | 8/2016 | Bahrs et al. | |

OTHER PUBLICATIONS

Chow, Yuan-Chieh and Walter H. Kohler. "Models for Dynamic Load Balancing in a Heterogeneous Multiple Processor System" IEEE 1979 [online] downlaoded May 31, 2018 https://ieeexplore.ieee.org/stamp/stamp.jsp?tp=&arnumber=1675365.*
U.S. Appl. No. 14/617,902, filed Feb. 9, 2015.

* cited by examiner

*Primary Examiner* — Ben M Rifkin
(74) *Attorney, Agent, or Firm* — Stephen J. Walder, Jr.; Alexander G. Jochym

(57) ABSTRACT

In filtering requests to be forwarded to a runtime environment, a filtering apparatus intercepts a new runtime request for the runtime environment and determines execution paths that may be traversed by the runtime request when executed in the runtime environment. The filtering apparatus assigns a probability of traversal by the runtime request to each of the execution paths and identifies at least one given execution path that reference a stressed resource of the runtime environment. Based on the probabilities assigned to the at least one given execution path, the filtering apparatus determines whether or not to block the runtime request from being sent to the runtime environment. If the probability assigned to the at least one given execution path exceeds a configured threshold, the runtime request is blocked from being sent to the runtime environment. Otherwise, the runtime request is sent to the runtime environment.

18 Claims, 5 Drawing Sheets

SOFTWARE REQUEST-FILTERING PREDICTIVE TECHNIQUE BASED ON RESOURCE USAGE PROBABILITIES

BACKGROUND

Middleware software solutions typically depends on resources of a runtime environment with well-defined capacities. Such solutions serve a variety of requests, and each request will require a number of runtime environment resources engaged in a certain sequence to fulfill the request. For example, a web request may flow through a web server that forwards the request to an application server that may use a database to fulfill the request. All of these resources are required to fulfill the request. However, forwarding the request to a software runtime environment that is experiencing a problem with a critical resource may make the problem worse. For example, the request may require memory beyond the physical capacity of the runtime environment. If this request is forwarded to the runtime environment, it will impact other requests being fulfilled.

SUMMARY

According to one embodiment of the present invention, in filtering requests to be forwarded to a runtime environment, a filtering apparatus intercepts a new runtime request for the runtime environment and determines execution paths that may be traversed by the runtime request when executed in the runtime environment. The filtering apparatus assigns a probability of traversal by the runtime request to each of the execution paths and identifies at least one given execution path that reference a stressed resource of the runtime environment. Based on the probabilities assigned to the at least one given execution path, the filtering apparatus determines whether or not to block the runtime request from being sent to the runtime environment. If the probability assigned to the at least one given execution path exceeds a configured threshold, the runtime request is blocked from being sent to the runtime environment. Otherwise, the runtime request is sent to the runtime environment.

System and computer program products corresponding to the above-summarized methods are also described and claimed herein.

DETAILED DESCRIPTION

Figure 1:
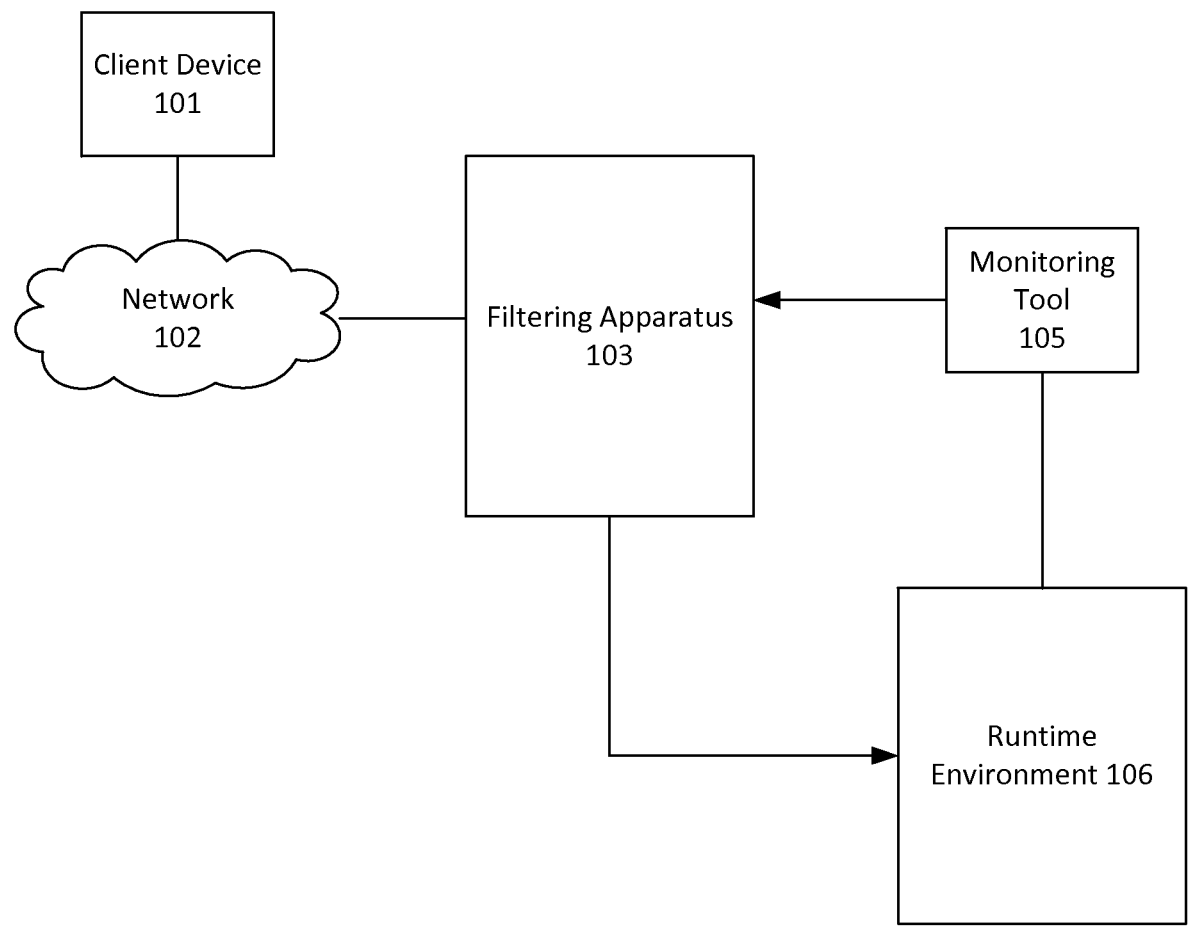
FIG. 1 illustrates a system for filtering requests to be forwarded to a runtime environment according to embodiments of the present invention

Embodiments of the present invention provide the ability to filter runtime requests based on the state of resources in a runtime environment, before the request enters a runtime environment. FIG. 1 illustrates a system for filtering requests to be forwarded to a runtime environment according to embodiments of the present invention. The system includes a client device 101 which sends a new runtime request over a network 102 to be executed in a runtime environment 106. Here, a "new" runtime request is a runtime request that has not been executed in the runtime environment before. A filtering apparatus 103 coupled to the network 102 is capable of intercepting the runtime request prior to the request reaching the intended runtime environment 106. The filtering apparatus 103 determines whether or not to forward the runtime request to the runtime environment 106 based on the probable impact on resources of the runtime environment. The functionalities of the filtering apparatus 103 are described further below. A monitoring tool 105 may be used to monitor the current states of the resources of the runtime environment 106 and to report the current states to the filtering apparatus 103.

Figure 2:
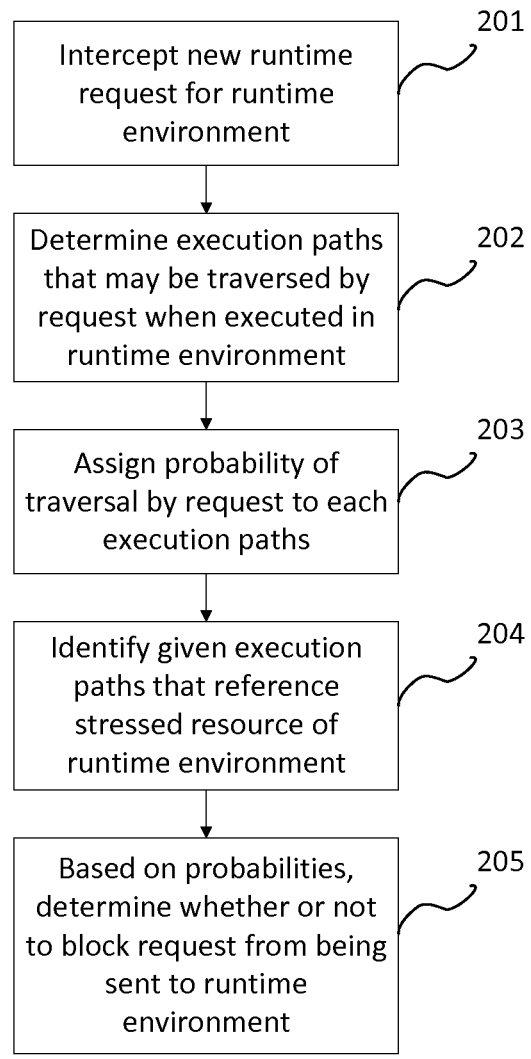
FIG. 2 illustrates a method for filtering requests to be forwarded to a runtime environment according to embodiments of the present invention.

FIG. 2 illustrates a method for filtering requests to be forwarded to a runtime environment according to embodiments of the present invention. In this embodiment, the method is implemented by the filtering apparatus 103. First, the filtering apparatus 103 intercepts a new runtime request for the runtime environment 106 (201). The new runtime request is intercepted before the request enters the runtime environment 106. The filtering apparatus 103 determines one or more execution paths that may be traversed by the request if the request is executed in the runtime environment (202). The filtering apparatus 103 assigns a probability of traversal by the request to each of the execution paths (203). The filtering apparatus 103 then identifies the given execution paths that reference a stressed resource of the runtime environment (204). Based on the probabilities assigned to the given execution paths, the filtering apparatus 103 determines whether or not to block the request from being sent to the runtime environment 106 (205). In response to determining that the probabilities assigned to the given execution paths exceed a configured threshold, the filtering apparatus 103 blocks the runtime request from being sent to the runtime environment. Otherwise, the runtime request is sent to the runtime environment.

In one embodiment, in determining the execution path(s) that may be traversed by the request if the request is executed in the runtime environment 106, the filtering apparatus 103 determines a request class to which the runtime request belongs. A request class may be defined as a syntax pattern that matches a set of requests. The filtering apparatus 103 maps the request class to a resource tree with n possible sub-trees. Each sub-tree of the resource tree represents a possible execution path for requests in the class. A resource tree is a representation of the resources of a runtime environment that are required to fulfill a runtime request. Other manners of representation may instead be used. The filtering apparatus 103 then identifies possible resource sub-trees that the specific request may traverse. As requests traverse through the runtime environment 106, the resource tree for each request class may be built and stored in a repository of request-to-resource tree mappings.

Figure 3A:
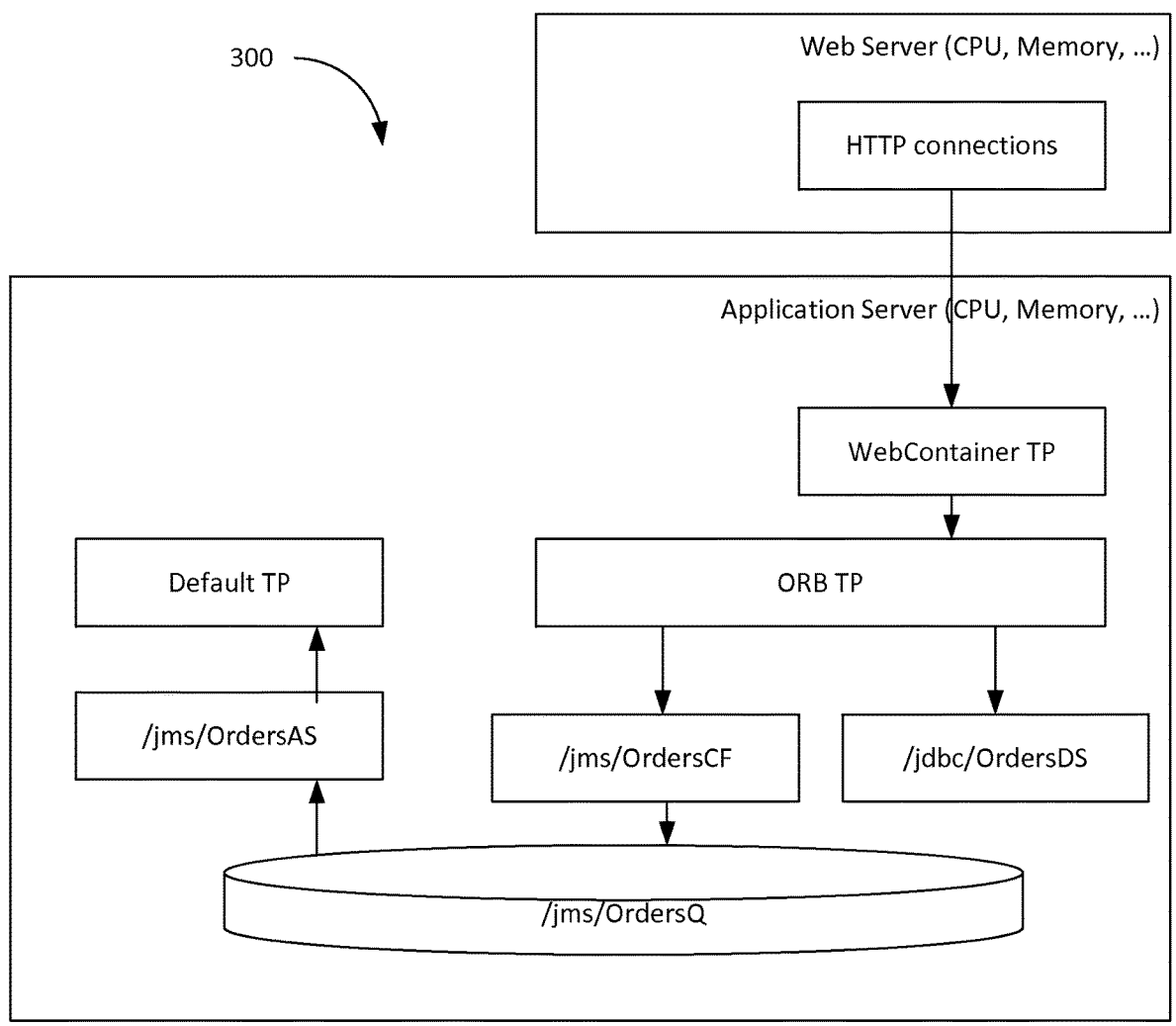
FIGS. 3A and 3B illustrate example execution paths according to embodiments of the present invention.

Mapping the request class to a resource tree may be implemented in a number of ways. For example, the filtering apparatus 103 may deduce the mapping from an environment configuration. Consider for example a web application that contains Java Server Pages, Enterprise Java Beans, and deployment descriptors where various resources required by the web application are declared. The deployment descriptors may be used to map the request class to a possible resource tree. For example, the request class, /order/*.jsp, may be mapped to a resource tree 300, illustrated in FIG. 3A, representing resources of a web server and an application server in the runtime environment 106. /order/*.jsp is defined as a request class because there is a declaration of the web root context in an application deployment descriptor and there is a list of Java Server Pages (JSP) that have names ending with ".jsp". Since all JSP pages run on WebContainer threads, the WebContainer thread pool is a critical resource and part of the resource tree 300. Similarly, the application declares Enterprise Java Beans which run on Object Request Broker (ORB) threads. ORB is thus another critical resource required to run Enterprise Java Beans and part of the resource tree 300. One or more JSP page requests may traverse only the sub-tree HTTPConnections→WebContainer. Other JSP page requests may traverse only the sub-tree HTTPConnections→WebContainer→ORB as the JSP page invokes an Enterprise Java Bean that runs on an ORB thread. Optionally, to increase the accuracy of the resource tree mapping to a request class, each runtime request execution in the runtime environment 106 may be traced to identify the actual execution path taken. The tracing also identifies the sub-trees that may be more heavily traversed than others, allowing the resource tree to be further augmented with additional information, such as a percentage of requests traversing various sub-trees.

In identifying the possible resource sub-trees a specific runtime request may traverse, the historical information of the execution of similar runtime requests may be used, if available. For example, assume that the request/order/profile.jsp has been executed in the runtime environment 106 before and has traversed the sub-tree HTTPConnections→WebContainer→ORB. If the request/order/profile.jsp is intercepted again, then the filtering apparatus 103 is able to identify the same sub-tree that the request historically traversed. When a new runtime request is intercepted for which no execution history exists, the filtering apparatus 103 identifies the request class and the corresponding resource tree, and identifies all of the possible sub-trees that the request may traverse. For example, assume that the request/order/profile1.jsp is intercepted and there is no execution history for this request. Assume also that the filtering apparatus 103 identifies the request class and maps the request class to the resource tree 300 shown in FIG. 3A. The filtering apparatus 103 deduces a number of sub-trees from the resource tree 300. Some sub-trees deduced from the resource tree 300 are as follows:

HTTPConnections→WebContainer
HTTPConnections→WebContainer→ORB
HTTPConnections→WebContainer→ORB→/jdbc/OrdersDS
HTTPConnections→WebContainer→ORB→/jms/OrdersCF The request/order/profile1.jsp may traverse any unique sub-tree that starts from the tree root HTTPConnections. The sub-tree may be expressed as an XPath expression: HTTPConnection/WebContainer.

Figure 3B:
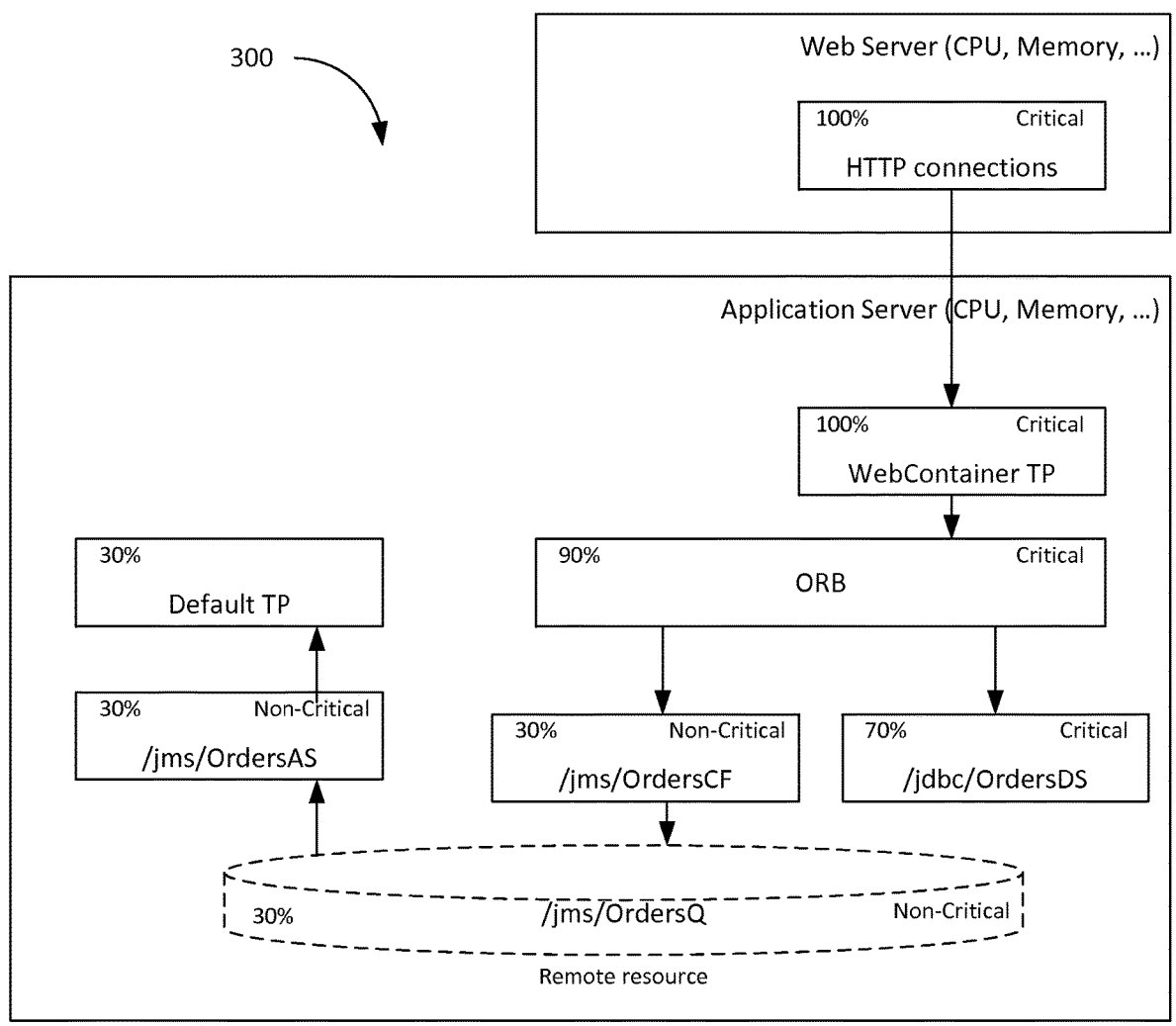

In assigning a probability of traversal by the runtime request to each execution path, if no execution history associated with the request class exists, then each sub-tree is assigned the same probability of being traversed. If an execution history associated with the request class exists, then the probability of a request traversing a sub-tree is related to the percentage of requests that used the resources on that sub-tree. For example, each resource in the resource tree 300 is associated with a percentage of requests that used each resource, as illustrated in FIG. 3B. For illustrative purposes, the percentage of requests using the particular resource is identified in the upper left of each resource, and the resource criticality is identified in the upper right of each resource.

In identifying the given execution paths that reference stressed resource of the runtime environment 106, the filtering apparatus 103 identifies the resource sub-trees impacted by a specific resource problem in the runtime environment 106. When there is a resource problem in the runtime environment 106, the monitoring tool 105 detects this problem and sends an alert to the filtering apparatus 103. The filtering apparatus 103 identifies the resource sub-trees that reference the resource with the problem. For example, using the request/order/profile1.jsp, assume that the ORB thread pool usage is 90% and the filtering apparatus 103 receives a usage alert for the ORB thread pool from the monitoring tool 105. In response, the filtering apparatus 103 finds all of the sub-trees that reference the ORB thread pool using XPath expressions. Thus, the filtering apparatus 103 determines that the request/order/profile1.jsp (a request without an execution history) will cause a problem in the runtime environment 106 if it traverses any sub-tree except the first sub-tree, HTTPConnections→WebContainer.

Based on the probabilities assigned, the filtering apparatus 103 determines whether or not to block the request from being sent to the runtime environment 106. If one or more of the execution paths that reference the stressed resource has an assigned probability above a configured threshold, then the runtime request is blocked. Otherwise, the runtime request is sent to the runtime environment 106. In the example above and illustrated in FIG. 3B, the request/order/profile1.jsp (a request without an execution history) will be blocked by the filtering apparatus 103 because the ORB thread pool is critical and 90% of requests use the ORB resource. Forwarding the/order/profile1.jsp request to the runtime environment 106 thus carries a high risk of not being processed and/or causing problems for requests currently being processed in the runtime environment 106. However, if the filtering apparatus 103 receives an alert from the monitoring tool 105 for the resource/jms/OrdersAS, which is a non-critical resource and only 30% of requests use this resource, then sending the /order/profile1.jsp request to the runtime environment 106 carries a low risk, and the filtering apparatus 106 will not block the request from being sent to the runtime environment 106.

Optionally, business rules relevant to the resources and/or the runtime requests may also be considered in the decision whether or not to block a runtime request from being sent to the runtime environment 106. The business rules may be specified by a customer or a system owner of the runtime environment 106 and enforced by the filtering apparatus 103. A business rule may be configured to override the decision made by the filtering apparatus 103. For example, a business rule may state that a runtime request is to be blocked when a particular resource is unavailable, regardless of the probability assigned to the resource.

Figure 4:
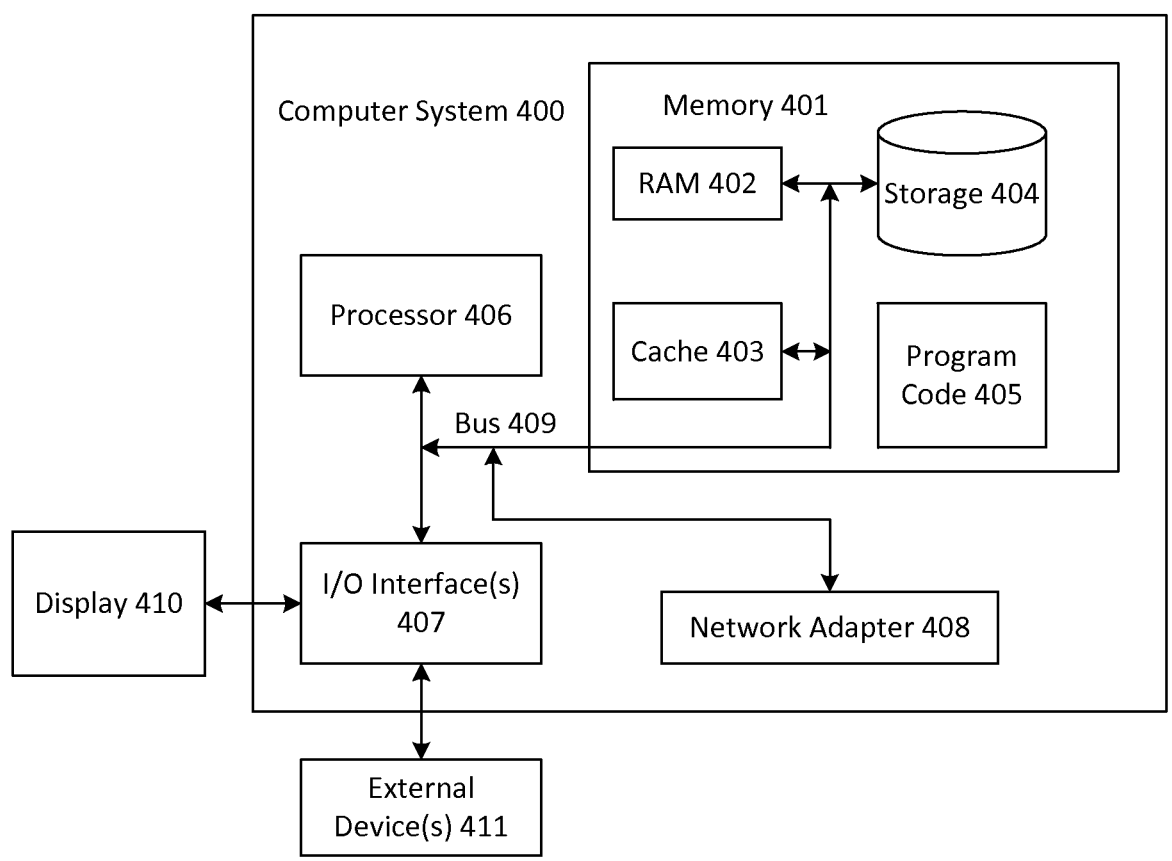
FIG. 4 illustrates a computer system according to embodiments of the present invention.

In one embodiment, the filtering apparatus 103 is implemented by a computer system according to embodiments of the present invention, as illustrated in FIG. 4. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for filtering requests to be forwarded to a runtime environment, comprising:

intercepting, by a filtering apparatus in the data processing system, a runtime request before the runtime request enters the runtime environment, wherein the runtime environment comprises a plurality of resources and wherein one or more of the resources in the plurality of resources may be utilized to execute the runtime request;

determining, by the filtering apparatus, one or more execution paths that may be traversed within the runtime environment, wherein each execution path in the one or more execution paths comprises at least one difference in resources utilized;

assigning, by the filtering apparatus, a probability of traversal to each execution path in the one or more execution paths;

identifying, by the filtering apparatus, at least one execution path of the one or more execution paths that references a stressed resource of the runtime environment;

based on the probabilities assigned to the at least one execution path, determining, by the filtering apparatus, whether or not to block the runtime request from being sent to the runtime environment;

in response to determining that the probability assigned to the at least one execution path exceeds a configured threshold, blocking, by the filtering apparatus, the runtime request from being sent to the runtime environment; and in response to determining that the probability assigned to the at least one execution path does not exceed the configured threshold, sending, by the filtering apparatus, the runtime request to the runtime environment.

2. The method of claim 1, wherein the determining of the one or more execution paths that may be traversed within the runtime environment comprises:

determining, by the filtering apparatus, a request class to which the runtime request belongs;

mapping, by the filtering apparatus, the request class to a resource tree, wherein the resource tree represents one or more resources in the runtime environment; and identifying by the filtering apparatus, one or more of the sub-trees, in the resource tree, that may be traversed within the runtime environment, wherein each sub-tree in the one or more sub-trees represents an execution path in the runtime environment.

3. The method of claim 2, wherein the identifying, in the resource tree, of the one or more of the sub-trees that may be traversed within the runtime environment comprises:

when no execution history exists for the request class of the runtime request, deducing, by the filtering apparatus, the one or more sub-trees from one or more application deployment descriptors of the resources within the runtime environment; or when an execution history does exist for the request class of the runtime request:
identifying, by the filtering apparatus, a previous execution of previous runtime request that matches the request class of the runtime request; and
identifying, by the filtering apparatus, the one or more sub-trees used in the execution of the previous runtime request.

4. The method of claim 1, wherein the assigning of the probability of traversal to each execution path in the one or more execution paths comprises:

when no execution history exists for the request class of the runtime request, assigning, by the filtering apparatus, each execution path the same probability.

5. The method of claim 1, wherein the assigning of the probability of traversal to each execution path in the one or more execution paths comprises:

when an execution history exists for the request class of the runtime request, assigning, by the filtering apparatus, each execution path a probability based on a percentage of previous runtime requests that historically used the execution path.

6. The method of claim 1, wherein the identifying of the at least one execution path of the one or more execution paths that references the stressed resource of the runtime environment comprises:

receiving, by the filtering apparatus, an alert from a monitoring tool coupled to the runtime environment that a resource is stressed; and determining, by the filtering apparatus, that the at least one execution path references the resource that is stressed.

7. A computer program product for filtering requests to be forwarded to a runtime environment, the computer program product comprising a computer readable storage medium having program instructions embodied therewith, the program instructions executable by a processor in a filtering apparatus to cause the processor to:

intercept a runtime request before the runtime request enters the runtime environment, wherein the runtime environment comprises a plurality of resources and wherein one or more of the resources in the plurality of resources may be utilized to execute the runtime request;

determine one or more execution paths that may be traversed within the runtime environment, wherein each execution path in the one or more execution paths comprises at least one difference in resources utilized;

assign a probability of traversal to each execution path in the one or more execution paths;

identify at least one execution path of the one or more execution paths that references a stressed resource of the runtime environment;

based on the probabilities assigned to the at least one execution path, determine whether or not to block the runtime request from being sent to the runtime environment;

in response to determining that the probability assigned to the at least one execution path exceeds a configured threshold, block the runtime request from being sent to the runtime environment; and in response to determining that the probability assigned to the at least one execution path does not exceed the configured threshold, send the runtime request to the runtime environment.

8. The computer program product of claim 7, wherein the program instructions to determine the one or more execution paths that may be traversed within the runtime environment further causes the processor to:
- determine a request class to which the runtime request belongs;
- map the request class to a resource tree, wherein the resource tree represents one or more resources in the runtime environment; and
- identify one or more of the sub-trees, in the resource tree, that may be traversed within the runtime environment, wherein each sub-tree in the one or more sub-trees represents an execution path in the runtime environment.

9. The computer program product of claim 8, wherein the program instructions to identify the one or more of the sub-trees that may be traversed within the runtime environment further causes the processor to:
- when no execution history exists for the request class of the runtime request, deduce the one or more sub-trees from one or more application deployment descriptors of the resources within the runtime environment; or
- when an execution history does exist for the request class of the runtime request:
  - identify a previous execution of previous runtime request that matches the request class of the runtime request; and
  - identify the one or more sub-trees used in the execution of the previous runtime request.

10. The computer program product of claim 7, wherein the program instructions to assign the probability of traversal to each execution path in the one or more execution paths further causes the processor to:
- when no execution history exists for the request class of the runtime request, assign each execution path a same probability.

11. The computer program product of claim 7, wherein the program instructions to assign the probability of traversal to each execution path in the one or more execution paths further causes the processor to:
- when an execution history exists for the request class of the runtime request, assign each execution path a probability based on a percentage of previous runtime requests that historically used the execution path.

12. The computer program product of claim 7, wherein the program instructions to identify the at least one execution path of the one or more execution paths that references the stressed resource of the runtime environment further causes the processor to:
- receive an alert from a monitoring tool coupled to the runtime environment that a resource is stressed; and
- determine that the at least one execution path references the resource that is stressed.

13. A filtering system, comprising:
- a processor; and
- a computer readable storage medium having program instructions embodied therewith, the program instructions executable by the processor to cause the processor to:
- intercept a runtime request before the runtime request enters the runtime environment, wherein the runtime environment comprises a plurality of resources and wherein one or more of the resources in the plurality of resources may be utilized to execute the runtime request;
- determine one or more execution paths that may be traversed within the runtime environment, wherein each execution path in the one or more execution paths comprises at least one difference in resources utilized;
- assign a probability of traversal to each execution path in the one or more execution paths;
- identify at least one execution path of the one or more execution paths that references a stressed resource of the runtime environment;
- based on the probabilities assigned to the at least one execution path, determine whether or not to block the runtime request from being sent to the runtime environment;
- in response to determining that the probability assigned to the at least one execution path exceeds a configured threshold, block the runtime request from being sent to the runtime environment; and
- in response to determining that the probability assigned to the at least one execution path does not exceed the configured threshold, send the runtime request to the runtime environment.

14. The filtering system of claim 13, wherein the program instructions to determine the one or more execution paths that may be traversed within the runtime environment further causes the processor to:
- determine a request class to which the runtime request belongs;
- map the request class to a resource tree, wherein the resource tree represents one or more resources in the runtime environment; and
- identify one or more of the sub-trees, in the resource tree, that may be traversed within the runtime environment, wherein each sub-tree in the one or more sub-trees represents an execution path in the runtime environment.

15. The filtering system of claim 14, wherein the program instructions to identify the one or more of the sub-trees that may be traversed within the runtime environment further causes the processor to:
- when no execution history exists for the request class of the runtime request, deduce the one or more sub-trees from one or more application deployment descriptors of the resources within the runtime environment; or
- when an execution history does exist for the request class of the runtime request:
  - identify a previous execution of previous runtime request that matches the request class of the runtime request; and
  - identify the one or more sub-trees used in the execution of the previous runtime request.

16. The filtering system of claim 13, wherein the program instructions to assign the probability of traversal to each execution path in the one or more execution paths further causes the processor to:
- when no execution history exists for the request class of the runtime request, assign each execution path a same probability.

17. The filtering system of claim 13, wherein the program instructions to assign the probability of traversal to each execution path in the one or more execution paths further causes the processor to:
- when an execution history exists for the request class of the runtime request, assign each execution path a probability based on a percentage of previous runtime requests that historically used the execution path.

18. The filtering system of claim 13, wherein the program instructions to identify the at least one execution path of the one or more execution paths that references the stressed resource of the runtime environment further causes the processor to:
    receive an alert from a monitoring tool coupled to the runtime environment that a resource is stressed; and
    determine that the at least one execution path references the resource that is stressed.

\* \* \* \* \*